United States Patent [19]

Habelt

[11] 4,005,871
[45] Feb. 1, 1977

[54] MARKING DEVICE FOR A RECORDING APPARATUS

[75] Inventor: Gerhard Habelt, Vienna, Austria

[73] Assignee: U.S. Philips Corporation, New York, N.Y.

[22] Filed: July 17, 1975

[21] Appl. No.: 596,952

[30] Foreign Application Priority Data

July 26, 1974 Austria .................... 6166/74

[52] U.S. Cl. .................... 274/1 R; 74/53; 179/100.1 DR
[51] Int. Cl.² .................... G11B 27/00
[58] Field of Search .......... 179/100.1 DR; 360/137; 274/1 R, 17; 74/53

[56] References Cited

UNITED STATES PATENTS

| | | | |
|---|---|---|---|
| 2,820,639 | 1/1958 | Gillette et al. | 274/1 R |
| 2,843,386 | 7/1958 | Stanton et al. | 274/17 |
| 2,940,761 | 6/1960 | LaForest | 274/1 R |
| 2,974,960 | 3/1961 | Hyatt | 274/17 |

Primary Examiner—Richard E. Aegerter
Assistant Examiner—John W. Shepperd
Attorney, Agent, or Firm—Frank R. Trifari; David R. Treacy

[57] ABSTRACT

A marking device for a recording apparatus with a scriber movable from a rest position along a strip towards either of two marking zones provided on the strip. The scriber is coupled to an actuating lever pivoted in either direction from a rest position by rotation of a crank in a respective selected direction through one full revolution. A lost-motion connecting link establishes lever direction in response to crank rotational direction.

3 Claims, 3 Drawing Figures

MARKING DEVICE FOR A RECORDING APPARATUS

BACKGROUND OF THE INVENTION

1. Field of the Invention

The invention relates to a marking device for a recording and/or playback apparatus, hereinafter referred to as recording apparatus which device comprises a scriber movable along an index strip in synchronism with the relative movement between a record carrier and a scanning element, for making a mark in one of two marking zones, which extend adjacent each other in the longitudinal direction of the index strip, and movable from a rest position in two directions which are transverse and oblique relative to the longitudinal direction of the index strip; and more particularly to a device in which, for transverse movement the scriber is coupled to an actuating lever, which is optionally pivotable from a rest position into one of two opposite directions with the aid of an actuating device through a control device.

2. Description of the Prior Art

Such a marking device is for example known from U.S. Pat. No. 2,820,639, in which the mechanism comprises a control device for the actuating lever which is coupled to the scriber, which control device is mechanically connected to the actuating device and is manually movable against the force of a return spring, so that no remote control of said marking device is possible. However, remote control is required in, for example, a recording apparatus which is incorporated in a central dictation system, which apparatus during operation is remote-controlled via telephone lines, or in an apparatus which can be remote-controlled from a microphone. Moreover, each time that a mark is to be made by that known marking device the force of the return spring must be overcome, which spring returns the control device and the actuating device to their rest positions upon their release, so that an appreciable force is required, because the return spring must be sufficiently strong to ensure that the control device and the actuating are reset under all circumstances.

SUMMARY OF THE INVENTION

It is an object of the invention to provide a simple and reliable marking device which is readily controlled remotely and can easily overcome force of a return spring.

According to the invention the control device comprises a motor, which can be energized by an actuating device so as to drive a shaft and crank one full revolution in a selected direction of rotation, and a connecting link coupling the crank to the actuating lever through a pivotal and a pin-slot connection. In the rest position of the control device the pivoting spindle of the actuating lever, the crank shaft and the pivoting spindle of the connecting link are disposed substantially on one straight line, the longitudinal direction of the slot substantially corresponding to the direction of said straight line, and the pin being located at an end of the slot, such that when the control device leaves the rest position there is free movement between pin and slot until the other end of the slot is reached.

A marking device according to the invention has the advantage that all parts of the marking device which are moved during marking are automatically and directly returned to their rest positions after one complete revolution of the motor. No additional steps, such as the incorporation of a return spring, need therefore be taken, so that a device is obtained which requires a very small actuating force, which moreover consists of simple components and thus guarantees high reliability. Furthermore, owing to the presence of the motor which can be energized by an actuating device, remote control of the marking device is possible.

In a preferred embodiment of the invention at least one spring acts on the actuating lever, under the influence of which in the rest position of the control device the longitudinal direction of the slot in the actuating lever coincides with the direction of the straight line, which in said rest position extends through the pivoting spindle of the actuating lever, the motor shaft and the pivoting spindle of the push rod. This step ensures that possible play in the pin-slot connection is compensated for, so that the slot assumes a defined position after each movement of the control device. As it only serves for the compensation of play, the spring may be very weak, so that it presents hardly any additional load to the motor.

The invention will now be described in more detail with reference to an embodiment shown in the drawings, but to which embodiment the scope of the invention is not limited.

DESCRIPTION OF THE PREFERRED EMBODIMENTS

Figure 1:
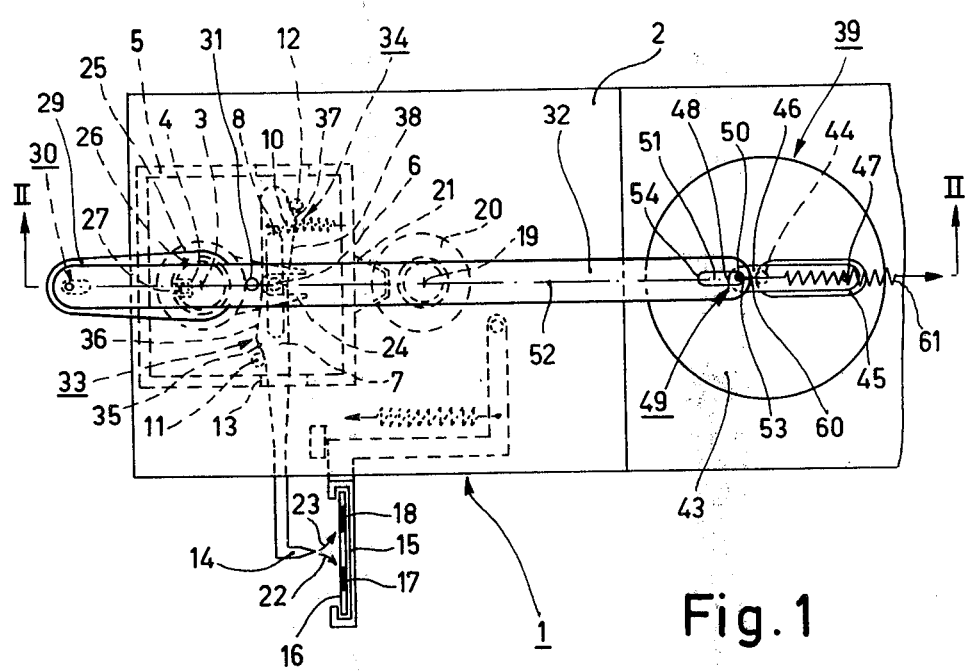
FIG. 1 is a side view of a marking device in the rest position, viewed in the longitudinal direction of an index strip.

The marking device 1 shown in the drawing for a recording apparatus comprises a substantially U-shaped frame 2, which is shown only and which may form part of the apparatus frame in which a grooved spindle 3 with a longitudinally extending groove 4 is rotatably journalled. On the grooved spindle 3 a housing 5, which is movable in the longitudinal direction of the spindle, is disposed for a scriber 7 which is pivotably journalled about a pivoting spindle 6, the ends of the pivoting spindle 6 projecting in two guiding grooves 8 and 9 formed at the inside of the housing. In its rest position the scriber 7 is held against two pin-shaped stops 11 and 12 by means of a spring 10 which is secured to the housing 5. A knife-shaped free end 14 of the scriber 7, which end projects through an opening 13 in the housing 5 is disposed opposite an index strip holder 15, which is pivotably and resiliently journalled in the frame 2, in such a way that on an index strip 16, which is inserted in said holder 15, which strip has two marking zones 17 and 18 which adjoin each other in its longitudinal direction, marks can be made by means of the scriber 7 by moving said scriber in two directions which are transverse and oblique relative to the longitudinal direction and plane of the index strip 16, which will be described in more detail hereinafter.

Driving the scriber 7, so as to move it along the index strip 16, is effected by a threaded spindle 19 which is rotatably journalled in the frame 2, which spindle, in a manner not shown, can be driven in synchronism with the relative movement between a record carrier and a scanning element for said carrier, for example by a winding device for the record carrier. On the threaded spindle 19 a nut 20 is fitted, which by means of a coupling piece 21 of the housing 5 for the scriber 7 is locked against rotation and so can be moved longitudinally along the threaded spindle 19. As a result, the scriber can be moved along an index strip inserted in the index-strip holder in synchronism with the relative movement between a record carrier and a scanning element for said carrier. The scriber may then also be employed as pointer of a counting mechanism. Of course, the scriber and its housing may also be driven by means of a belt.

As previously stated, for making a mark in one of the two marking zones 17, 18 of the index strip 16 the scriber is movable from its rest position in two directions which are transverse and oblique relative to the longitudinal direction and plane of the index strip 16, as is symbolically shown in FIG. 1 by two arrows 22 and 23.

For the transverse movement of the scriber 7 from the rest position into two opposite directions, its pivoting spindle 6, whose ends extend in guiding grooves 8, 9 of the housing 5 for guidance during the movement of the scriber, is lodged in a fork-shaped end 24 of a lever 25, which has a hole 26 through which the grooved spindle 3 projects, while inside its hole 26 the lever comprises a projection 27, which extends in the groove 4 of the grooved spindle 3, and thus pivotally couples the grooved spindle 3 to the lever 25. At one end 28 the grooved spindle is rigidly connected to an arm 29, whose free end is coupled by coupling means 30 to one end of an actuating lever 32 which is pivotable about a pivoting spindle 31. As a result, the actuating lever 32 is coupled to the scriber 7 for transmitting its pivoting movement to said scriber. It is obvious that the transmission of said pivoting movement need not be effected by means of a grooved spindle, but that for this purpose, for example also a special rod may be provided.

The oblique movement of the scriber 7 relative to the index strip 16 is derived from the transverse movement of the scriber. For this purpose the scriber 7 comprises two control portions 33 and 34, which cooperate with pin-shaped stops 11 and 12 provided in the housing, which portions each consist of two cam surfaces 35, 36 and 37, 38 respectively. The cam surfaces 35 and 37 serve for the oblique movement of the scriber 7 relative to the index strip 16, so that the free end 14 of the scriber can be brought into contact with the index strip, while the cam surfaces 36 and 38 cause a transverse movement of the scriber during which the scriber makes a mark on the index strip.

Through a control device 39 the actuating lever 32 is selectively pivotable, by means of an actuating device 42 which comprises two control buttons 40 and 41, from its rest position into one of two opposite directions. For example, by actuation of the button 40 a mark can be made which denotes the beginning or the end of a recording on a record carrier, in the marking zone 17, and by actuation of the button 41 a mark, which identifies the location of a recording on a record carrier to be corrected, erased or revised, is made other marking zone 18 on the index strip 16. However, the function of the buttons 40, 41 may also be remote-controlled.

The control device 39 comprises a motor 43 the is mounted on the frame 2, which motor shaft 44 driving a crank 45, on which a connecting link or push-rod 46 is pivotably journalled about a spindle 47. At its free end 48 the link 46 is coupled to the actuating lever 32 through a pin-slot connection 49, the pin 50 of said connection being disposed on the push-rod 46 and the slot 51 being formed in the actuating lever 32. In the rest position of the control device 39 the pivoting axis 31 of the actuating lever 32, the motor axis 44 and the pivoting axis 47 of the push-rod 46 are substantially located on one straight line 52, which in FIG. 1 is represented by a dash-dot line, the longitudinal direction of the slot 51 in the actuating lever 32 corresponding to the direction of said straight line 52. Furthermore, in the rest position of the control device 39 the pin 50 is situated against the end 53 of the slot 51 which faces the pivoting spindle 47 of the push-rod 40, which when the control device 39 leaves the rest position allows a free movement between the pin 50 and the slot 51 until the other end 54 of the slot 51 is reached. It is evident that if the kinematic relations further remain the same, the pin of the pin-slot connection may be disposed on the actuating lever and the slot may be formed in the push-rod.

By means of a motor control circuit 55 the motor 43 may be connected to a current source 56. The control circuit 55 includes a first set of two switches 57 and 58 which can be actuated by the buttons 40, 41 of the actuating device 42 or, as previously stated, by a remote control device, by the actuation of which the motor 43 can be started in opposite directions of rotations.

Figure 2:
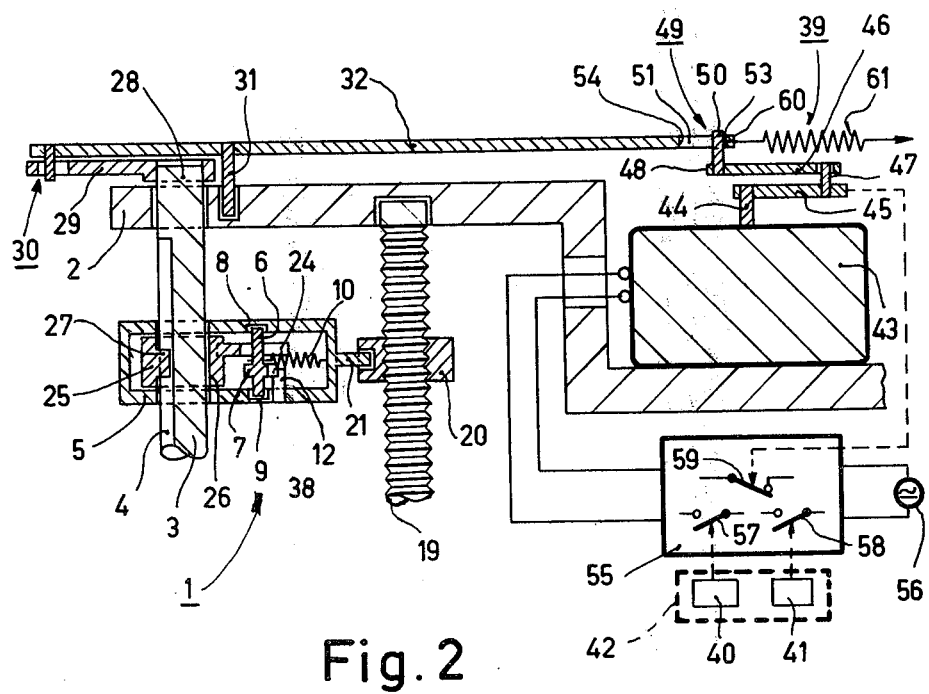
FIG. 2 is a cross-section through the marking device taken on the line II—II in FIG. 1, and showing the motor connections in a block diagram.

In order to stop the energized motor after one full revolution, the control circuit 55, as is symbolically shown in FIG. 2, comprises a second switch set, switch 59, which senses the position of the crank 45 and which disconnects the motor 43 from the current source 56 upon completion of one full revolution. The detailed circuit arrangement of the control circuit 55 is not shown, because it may be of any well-known type for starting a motor in either of two directions and stopping it when a limit is reached.

A tension spring 61 acts on the end 60 of the actuating lever 32, which end is coupled to the push-rod 46, under the influence of which spring, in the rest position of the control device 39, the longitudinal direction of the slot 51 in the actuating lever 32 coincides with the direction of the straight line 52, which in the rest position extends through the pivoting spindle 31 of the actuating lever 32, the motor shaft 44 and the pivoting spindle 47 of the pushrod 46. The spring 61 compensates for play in the pin-slot connection 49, thus ensuring that the actuating lever 32 is moved to its predetermined rest position after each pivoting movement. As the spring 61 merely serves to compensate for play in the pin-slot connection 49, said spring has been dimensioned so slack, that it presents substantially no additional load to the motor 43 when the actuating lever 32 is pivoted. It is evident that the same effect can also be obtained with the aid of different, suitably arranged springs, for example pressure springs or expansion springs. It is also possible to provide a smooth catch for the actuating lever 32, which defines its rest position.

During operation of the apparatus, the scriber 7 is moved along the index strip 16 inserted in the index strip holder 15 in synchronism with the relative movement between the a record carrier which is driven by the apparatus and a scanning element for said carrier. When for example during a recording process the end of the recording is reached and said location is to be indentified by a mark in the marking zone 17 on the index strip 16, the button 40 of the actuating device 42 must be actuated. As a result, the motor 43 is connected to the current source 56 by the control circuit 55 for one complete revolution, so that the crank 45 is rotated about the motor shaft 44 in an anti-clockwise direction, thus also moving the end of the 46 connected to the pivoting spindle 47.

Figure 3:
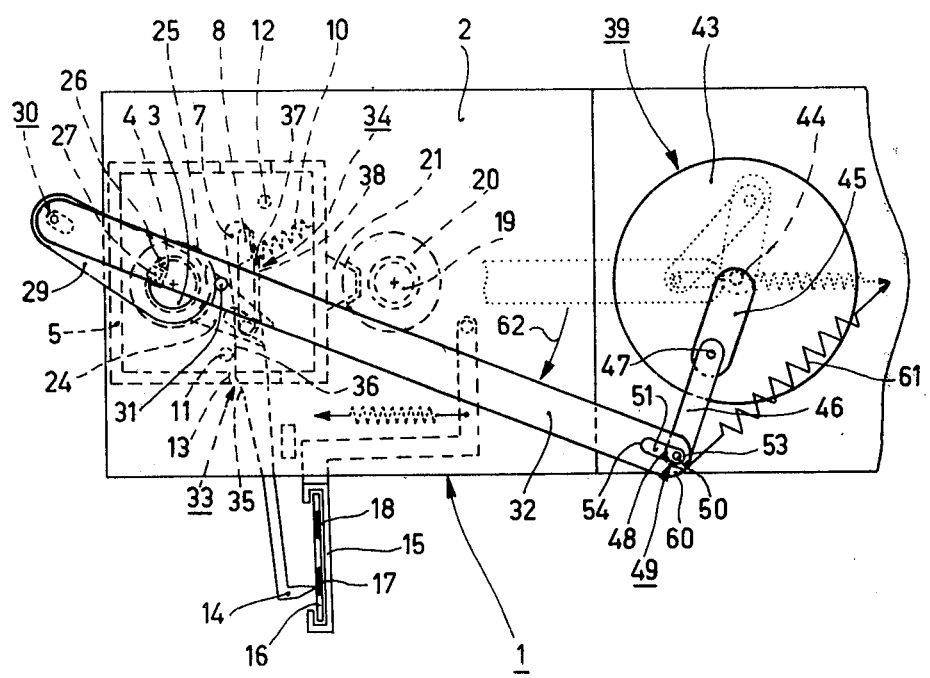
FIG. 3 is a similar side view of the marking device as in FIG. 1, but with the scriber being moved its maximum stroke in order to make a mark.

During the first part of said movement the pin 50 of the pin-slot connection 49 slides in the slot 51 formed in the actuating lever 32 from the end 53 towards the other end 54, the actuating lever 32 being positively retained in the rest position by the tension spring 61. In FIG. 3 dotted lines represent the position of the crank 45 and the push-rod 46 in which the pin 50 of the pin-slot connection 49 is located at the end 54 of the slot 51.

During the subsequent part of said movement the pin 50 can no longer move in the slot 51, so that the push-rod now exerts a force on the actuating lever 32, which causes it to be pivoted in the direction of the arrow 62. The pivoting movement of the actuating lever 32 is transmitted by the coupling means 30 to the arm 29 and hence to the grooved spindle 3, which in its turn transmits the pivoting movement through its groove 4 and the projection 27 of lever 25 which projects in the groove to said lever. As a result, the pivoting spindle 6 of the scriber 7 is moved in the guide grooves 8, 9 of the housing 5 for the transverse movement of said scriber because of movement of the fork-shaped end 24 of the lever 25. During the transverse movement of the scriber 7 the part 35 of the control link 33 first slides over the pin-shaped stop 11 into the housing 5, so that the knife-shaped free end 14 of the scriber 7 is obliquely moved towards the index strip 16. As soon as the free end 14 of the scriber 7 touches the index strip 16, the index strip holder 15 is slightly pivoted, the spring which loads the index strip holder then determining the contact pressure between the scriber 7 and the index strip 16. Subsequently, the section 36 of the control link 33 slides over the stop 11, which results in a movement of the free end 14 of the scriber 7 which is substantially parallel to the plane of the index strip 16 which has been inserted in the slightly tilted index strip holder, the scriber 7 then making a mark on the index strip 16 in the marking zone 17. FIG. 3 shows the position assumed by the control device and the parts of the marking device moved thereby after a mark has been made in the marking zone 17.

During a last part of said movement, during which the crank 45 completes a full revolution about the shaft 44, the crank 45, the push-rod 46, and thus the actuating lever 32 are returned to their original positions. In a corresponding manner the arm 29, the grooved spindle 3, the lever 25 and finally the scriber 7 are returned to their initial positions. When the crank 45 reaches its rest position, the switch 59 of the control circuit 55, which switch senses the position of the crank, is actuated, so that the motor 43 is disconnected from its current source 56 and consequently stops. The tension spring 16 ensures that the actuating lever 32, despite the mechanical play in the pin-slot connection 49 is positively returned to the predetermined rest position.

To make a mark in the other marking zone 18 of the marking strip 16 the button 41 of the actuating device 42 must be actuated, so that the motor 43 is started in the opposite direction of rotation and the parts of the marking device which are driven by the motor perform analogous but opposite movements, the actuating lever 32 now being pivoted out of its rest position is a direction opposite to that of the arrow 62.

As is evident from the above both the movement of the parts of the marking device for making a mark and the return movement are affected by the motor, so that said operations are performed in a simple and reliable manner, requiring little force.

What is claimed is:

1. A marking device for making marks at a selected one of two marking zones extending adjacent each other in the longitudinal direction of an index strip, comprising a frame, a spindle mounted in the frame, an actuating lever mounted for pivotal movement about the spindle, means for making a mark in a respective one of said two zones in response to pivoting of said lever in one of two opposite directions from a rest position, said means comprising a marking element and a linkage means for moving the element in a respective one of two directions in response to pivoting of said lever in opposite directions, and a control device for pivoting said lever in a selected one of said two opposite directions,
   wherein said control device comprises a crank, means for rotating the crank one full revolution about an axis in a selected one of two opposite directions of rotation from a rest position, said means comprising a motor and a motor control, and a connecting link connected to said crank at a first pivotal connection and connected to said actuating lever at a second pivotal connection, one of said pivotal connections being a pin-slot connection; in said rest position said pivoting spindle, said axis and said first pivotal connection being disposed substantially in a straight line, a longitudinal direction of said slot being aligned with said straight line and the pin being at an end of said slot such that upon initial rotation of said crank from said rest position said pin and slot undergo relative movement until the pin engages an opposite end of the slot.

2. A device as claimed in claim 1 comprising in addition a spring connected at an end to the actuating lever and arranged to urge the actuating lever to said rest position.

3. A device as claimed in claim 1, wherein said means for rotating the crank comprises an electric motor, means connecting said crank to said motor for rotation responsive to motor rotation, first switching means for selectively applying electric power to said motor to initiate rotation of said crank in a selected direction, and second switching means responsive to the position of said crank for supplying electric power to said motor for maintaining rotation of said motor to complete one full revolution of said crank.

* * * * *